(12) United States Patent
Oomori et al.

(10) Patent No.: US 9,590,475 B2
(45) Date of Patent: Mar. 7, 2017

(54) ELECTRIC POWER TOOL

(71) Applicant: Hitachi Koki Co., Ltd., Tokyo (JP)

(72) Inventors: Katsuhiro Oomori, Hitachinaka (JP); Junichi Tokairin, Hitachinaka (JP); Hiroki Uchida, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 505 days.

(21) Appl. No.: 14/106,609

(22) Filed: Dec. 13, 2013

(65) Prior Publication Data

US 2014/0139055 A1    May 22, 2014

Related U.S. Application Data

(63) Continuation of application No. 12/994,731, filed as application No. PCT/JP2009/059644 on May 20, 2009, now Pat. No. 8,627,900.

(30) Foreign Application Priority Data

May 29, 2008 (JP) ................................. 2008-141409
Sep. 1, 2008 (JP) ................................. 2008-224176

(51) Int. Cl.
*B25F 5/02* (2006.01)
*H02K 9/06* (2006.01)
(Continued)

(52) U.S. Cl.
CPC ............... *H02K 9/06* (2013.01); *B25F 5/008* (2013.01); *B25F 5/02* (2013.01); *H02K 7/145* (2013.01)

(58) Field of Classification Search
CPC .. B25F 5/00; B25F 5/001; B25F 5/008; B25F 5/02; B25D 16/00; B25D 17/20; H02K 5/148; H02K 11/28; H02K 11/33; H02K 23/08; H02K 23/30; H02K 23/66; H02K 7/145; H02K 9/06
(Continued)

(56) References Cited

U.S. PATENT DOCUMENTS 3,652,879 A  *  3/1972  Plunkett ................. B25F 5/008
                                                                310/242
3,718,193 A     2/1973  Wanner
(Continued)

FOREIGN PATENT DOCUMENTS

CN         1974140 A      6/2007
CN       201036866 A      3/2008
(Continued)

OTHER PUBLICATIONS

China Intellectual Property Office office action for application CN200980119635.0 Aug. 7, 2014.

*Primary Examiner* — Scott A. Smith
(74) *Attorney, Agent, or Firm* — Kilpatrick Townsend & Stockton LLP

(57) ABSTRACT

According to an aspect of the invention, an electric power tool which includes a brushless direct-current motor and a drive circuit that supplies drive power to the motor, and which rotates or drives a tool, characterized in that the drive circuit includes plural switching elements, and is arranged on a board provided in a grip portion of a housing or below the grip portion; and an electric fan is provided in the vicinity of the switching element for cooling the switching element.

6 Claims, 13 Drawing Sheets

(51) Int. Cl.
  *B25F 5/00* (2006.01)
  *H02K 7/14* (2006.01)

(58) Field of Classification Search
  USPC .... 173/117, 217, 169, 170, 171; 310/47, 50, 310/58
  See application file for complete search history.

(56) References Cited

U.S. PATENT DOCUMENTS

| | | | |
|---|---|---|---|
| 4,231,155 A | 11/1980 | Johne | |
| 4,314,170 A * | 2/1982 | Sahrbacker | H02K 23/66 310/50 |
| 5,816,121 A | 10/1998 | Yoshimizu et al. | |
| 6,123,158 A * | 9/2000 | Steffen | H02K 11/33 173/117 |
| 6,127,751 A * | 10/2000 | Kristen | B25F 5/008 173/117 |
| 6,296,427 B1 * | 10/2001 | Potter | B25F 5/001 173/217 |
| 6,325,157 B1 * | 12/2001 | Arakawa | B25D 16/00 173/117 |
| 6,509,555 B1 | 1/2003 | Riess et al. | |
| 6,543,549 B1 * | 4/2003 | Riedl | B25B 21/00 173/171 |
| 6,552,904 B2 * | 4/2003 | Fung | B25F 5/008 165/185 |
| 6,866,105 B2 * | 3/2005 | Pfisterer | B25D 17/20 173/117 |
| 7,064,462 B2 * | 6/2006 | Hempe | B23D 45/16 173/217 |
| 7,249,695 B2 * | 7/2007 | Shew | F16N 11/08 222/258 |
| 7,537,065 B2 * | 5/2009 | Gallagher | B24B 23/02 173/170 |
| 7,556,457 B2 | 7/2009 | Oda et al. | |
| 8,627,900 B2 * | 1/2014 | Oomori | B25F 5/008 173/168 |
| 2002/0182020 A1 | 12/2002 | Oomori et al. | |
| 2003/0030984 A1 | 2/2003 | Fung | |
| 2003/0071033 A1 | 4/2003 | Riess et al. | |
| 2003/0089511 A1 | 5/2003 | Tsuneda et al. | |
| 2004/0027010 A1 | 2/2004 | Oomori et al. | |
| 2004/0182336 A1 | 9/2004 | Ohmori et al. | |
| 2004/0226969 A1 | 11/2004 | Shew | |
| 2004/0263008 A1 * | 12/2004 | Voigt | B25F 5/008 310/58 |
| 2006/0222930 A1 * | 10/2006 | Aradachi | H01M 2/1055 429/96 |
| 2006/0255756 A1 | 11/2006 | Iwata et al. | |
| 2006/0261689 A1 | 11/2006 | Natsuhara et al. | |
| 2006/0266538 A1 * | 11/2006 | Stierle | B24B 23/028 173/217 |
| 2006/0272836 A1 * | 12/2006 | Hirayama | B25F 5/00 173/109 |
| 2008/0315693 A1 * | 12/2008 | Uchida | B25F 5/00 310/62 |
| 2009/0126964 A1 * | 5/2009 | Schroeder | B25F 5/02 173/217 |
| 2011/0253402 A1 | 10/2011 | Aradachi et al. | |

FOREIGN PATENT DOCUMENTS

| | | |
|---|---|---|
| DE | 10 2006 038 756 A1 | 2/2008 |
| EP | 1 081 827 A1 | 3/2001 |
| JP | 2004-357371 A | 12/2004 |
| JP | 2006-297532 A | 11/2006 |

* cited by examiner

ELECTRIC POWER TOOL

CROSS-REFERENCE TO RELATED APPLICATIONS

This application is a continuation application of U.S. application Ser. No. 12/994,731, filed Mar. 4, 2011, now U.S.Pat.No. 8,627,900 which is a US National Stage of International Application No. PCT/JP2009/059644, filed May 20, 2009, and which claims the benefit of Japanese Patent Application Nos. 2008-141409, filed May 29, 2008, and 2008-224176, filed Sep. 1, 2008, the entire contents of which are incorporated herein by reference.

TECHNICAL FIELD

The present invention relates to an electric power tool which has a compact size which using a brushless DC motor as a drive source.

BACKGROUND ART

Recently, a brushless DC motor has been used in an electric power tool which rotates a tool such as a drill or a driver by a motor thereby to perform the required work. The brushless DC motor is a DC (Direct-Current) motor having no brush (brush for communication), which uses coils (windings) on the stator side, and a permanent magnet on the rotor side, and applies the electric power driven by an inverter to the predetermined coil in order thereby to rotate a rotor. As an example of the brushless DC motor, for example, a brushless DC motor described in PTL 1 has been known. In this PTL 1, a switching element for switching on/off the current application to a coil wounded on a stator is arranged on a circular circuit board attached to the rear end side (the side opposite to an output shaft) of a motor. All the switching elements are mounted on a one-sided surface (surface on the rear side) of the circuit board, and abut on a heat radiating member fixed to a stator core separately from the circuit board for radiating the heat generated in the switching elements.

Recently, in an electric power tool which rotates and drives a tool such as a drill or a driver by a motor thereby to perform the required work, a fan for cooling the motor is provided. The fan is provided coaxially with the motor, and rotates with the rotation of the motor. Usually, the fan is provided on the rear end side of a rotational shaft of the motor or the front end side thereof, and a heat generating portion of the motor is cooled by the air flow generated by the fan. In an electric power tool using a brushless DC motor, since a rotor is rotated by supplying the electric power driven by an inverter to the predetermined coils in order, an inverter circuit composed by an output transistor is arranged, for example, at the rear of the motor, and the inverter circuit is also cooled by the air generated by the fan. Further, in PTL 2, a technology has been disclosed, in which a control transistor for a switch of an electric power tool is arranged on a heat sink, this heat sink is arranged near a battery, and the external air passes through the heat sink and the battery from an opening formed in a housing (lower portion of a handle portion) near the heat sink.

CITATION LIST

Patent Literature
PTL 1 : JP-A-2004 -357371
PTL 2 : US2003/0030984

SUMMARY OF INVENTION

Technical Problem

In a method of mounting all the switching elements on the rear surface of the circuit board, in view of a relation between a cooling surface and the mounting space, the switching elements are arranged so that the height direction of each switching element becomes parallel to a rotational shaft of the motor. However, such the arrangement enables realization of good cooling performance, but space corresponding to the heights of the circuit board and the switching element is required on the rear end side of the motor and in the axial direction thereof. Therefore, application of this motor to the electric power tool causes increase in length in a front-rear direction of a housing.

On the other hand, in order to prevent the length in the front-rear direction of the housing from increasing, it is also thought that the circuit board is not provided at the rear of the motor but provided in another position. However, since the large electric current flows in the switching element, it is necessary to cool the switching element. Usually, the switching element is cooled by a cooling fan rotated by the motor. Therefore, in case that the board mounting the switching element thereon is arranged in another position, a disadvantage of how cooling is performed is produced.

An object of the invention, in view of the above backgrounds, is to provide an electric power tool which can make a full length of the electric power tool compact by shortening the length in a front-rear direction of a housing.

Another object of the invention is to provide an electric power tool which realizes good cooling-structure while mounting a switching element in a position apart from a motor.

Still another object of the invention is to provide an electric power tool which can cool a switching element satisfactorily regardless of a rotary state of a motor.

Under the constitution using a brushless DC motor, in a method of mounting all switching elements on the rear side surface of a circuit board, the switching elements are arranged on a relation of mounting space so that the height direction of the switching element becomes parallel to a rotational shaft of the motor. However, such the arrangement requires space corresponding to the heights of the circuit board and the switching element on the rear side in the axial direction of the motor. Therefore, application of this motor to the electric power tool causes increase in length in a front-rear direction of a housing.

On the other hand, in order to prevent the length in the front-rear direction of the housing from increasing, it is also thought that the circuit board is not provided at the rear of the motor but provided in the handle portion of the housing as in PTL 2. However, the constitution in which an opening is provided in the housing and the heat from the heat sink and the battery portion is naturally radiated as in PTL 2 is enough for arrangement of only a switching element for controlling ON/OFF of the motor, but not enough to cool the switching element for the brushless DC motor to which the large current flows.

In view of the above backgrounds, an object of the invention is to provide an electric power tool which generates, by means of the existing motor cooling fan, air flow for cooling a control electric circuit arranged apart from a motor.

Another object of the invention is to provide an electric power tool which realizes the good cooling structure while mounting a switching element of a brushless DC motor in a position apart from the motor.

Still another object of the invention is to provide an electric power tool which cools actively a protective circuit for a brushed DC motor.

Solution to Problem

According to one feature of the invention, an electric power tool includes a brushless direct-current motor and a drive circuit that supplies drive power to the motor, and rotates or drives a tool. Herein, the drive circuit includes plural switching elements, and is arranged on a board provided in a grip portion of a housing or below the grip portion, and an electric fan is provided in the vicinity of the switching element in order to cool the switching element. There are provided below the grip portion of the housing an air intake for sucking the external air by the electric fan, and an air outlet for exhausting the air blown in the switching element. The air intake and the air outlet are provided on the side surface of the housing. The air intake is provided on the side surface on the rear side of the housing, and the air outlet is provided on the side surface on the front side of the housing.

According to another feature of the invention, there is provided a temperature sensor for measuring the temperature of a portion mounting the switching element. The temperature control by means of this temperature sensor is performed so that: in case that the temperature exceeds a predetermined value, the electric fan is driven; and when the temperature becomes lower than the predetermined value, the electric fan can be stopped. Further, another temperature control is performed so that: at the same time that the drive of the motor is driven, the electric fan is rotated; and even in case that the rotation of the motor is stopped, the electric fan is not stopped till the temperature becomes lower than the predetermined value.

According to another feature of the invention, the housing is provided with a display means which indicates that the electric fan is rotating, thereby to indicate to an operator that the electric fan is rotating. Further, the electric power tool includes a detachable battery for supplying electric power, and the board mounting the switching element thereon is provided between the battery and the grip portion. The switching element is arranged on the board so that its height direction extends from the board in the vertical direction.

According to another feature of the invention, an electric power tool includes a motor, a fan which is attached to a rotational shaft of the motor and cools the motor, a rotation transmitting means which transmits rotational force or drive force to a tool, and a housing for accommodating these parts therein. Herein, the housing includes a body portion which accommodates the motor and the rotation transmitting means therein, a handle portion extending from the body portion, and a battery retaining portion provided at the leading end of the handle portion; a control circuit for controlling the rotation of motor is arranged on a board provided in the handle portion or the battery retaining portion; and an air inlet/outlet is provided in the handle portion or the battery retaining portion, and air flow is generated in the handle portion by means of the fan, whereby the control circuit is cooled. The air flow in the handle portion may flow from the air exhaust side of the fan to the air inlet/outlet. To the contrary, the air flow may flow from the air inlet/outlet to the air intake side of the fan.

According to another feature of the invention, the motor is a brushless DC motor, and the control circuit includes an inverter circuit which drives the brushless DC motor. Herein, a switching element of the inverter circuit which is large in heat generation is cooled by the air flow which flows in the handle portion. Further, the motor is a brushed DC motor, and a control circuit of its motor includes an output transistor for protecting the motor. Herein, the output transistor which is large in heat generation is cooled by the air flow generated by the fan. In order to enhance the cooling effect, a commutating plate for commutating the air flow may be provided in the handle portion. Further, a guide passage in which the air flow passes may be formed in a part of the board or around the board. Further, a heat-insulating material may be provided on an inner wall or an outer wall of the handle portion of the housing. Furthermore, a filter for filtering the air may be provided in an air intake of the housing.

Advantageous Effects of Invention

According to the first aspect of the invention, the drive circuit including the switching elements is arranged on the board provided in the grip portion of the housing or below the grip portion, and the electric fan is provided in the vicinity of the switching element in order to cool the switching element. Therefore, the excessive space is not required on the rear side of the motor in the housing body portion, so that an electric power tool having a compact front-rear length can be realized. Further, since the electric fan is provided in order to cool the switching element, the effective cooling of the switching element can be realized.

According to the second aspect of the invention, there are provided below the grip portion of the housing the air intake for sucking the external air by the electric fan, and the air outlet for exhausting the air blown in the switching element. Therefore, even in case that the switching element having much heat generation is mounted in the narrow space in the housing, the switching element can be effectively cooled.

According to the third aspect of the invention, the air intake and the air outlet are provided on the side surface of the housing below the grip portion. Therefore, there is no fear that the air intake and the air outlet are occluded by the operator's hand, and the cooling performance can be kept good.

According to the fourth aspect of the invention, the air intake is provide on the side surface on the rear side of the housing, and the air outlet is provided on the side surface on the front side of the housing. Therefore, the air exhausted from the housing inside does not blow on the operator, so that the operator can perform working comfortably. Further, since the air intake is located on the rear side, that is, on the operator's side, even under such an environment as to generate dust during a cutting operation, the dust becomes difficult to enter the housing inside from the air intake.

According to the fifth aspect of the invention, there is provided the temperature sensor for measuring the temperature of the portion mounting the switching element, and only in case that the temperature exceeds the predetermined value, the electric fan is driven. Therefore, in case that a charging type battery is used, consumption of battery by the electric fan can be suppressed.

According to the sixth aspect of the invention, there is provided the temperature sensor for measuring the temperature of the portion mounting the switching element; and when the drive of the motor is started, the electric fan is rotated, and when the temperature becomes lower than the predetermined value, the electric fan is stopped. Therefore, even in products in which the rotation of motor frequently stops, such as a driver drill and a disk grinder, the switching element can be surely cooled regardless of stopping of the motor rotation.

According to the seventh aspect of the invention, the housing is provided with the display means which indicates that the electric fan is rotating. Therefore, even after the stop of the motor, the operator can confirm the rotary state of the electric fan, so that it is possible to prevent the battery from being detached during the rotation of the electric fan.

According to the eighth aspect of the invention, the electric power tool includes the detachable battery for supplying electric power to the drive circuit, and the board is provided between the battery and the grip portion. Therefore, the wiring distance between the battery and the board can be shortened.

According to the ninth aspect of the invention, the switching element is arranged on the board so that its height direction extends from the board in the vertical direction. Therefore, it is possible to arrange the switching element even in the inside of the grip portion where the thickness is limited.

According to the tenth aspect of the invention, the control circuit for controlling the rotation of motor is arranged on the board provided in the handle portion or the battery retaining portion, the air inlet/outlet is provided in the handle portion or the battery retaining portion, and the air flow is generated in the handle portion by means of the fan, whereby the control circuit is cooled. Therefore, even in case that the switching element that is much in heat generation is arranged in the narrow space in the handle portion, the switching element can be effectively cooled. Further, since it is not necessary to provide separately an electric fan for cooling the control circuit provided in the different place from the place at which the motor is provided, the effective cooling structure can be realized at low cost.

According to the eleventh aspect of the invention, since the air flow in the handle portion flows from the air exhaust side of the fan to the air inlet/outlet, the flowing direction of the air flow in the handle portion can be kept constant, and the effective cooling structure can be realized.

According to the twelfth aspect of the invention, since the air flow in the handle portion flows from the air inlet/outlet to the air intake side of the fan, the flowing direction of the air flow in the handle portion can be kept constant, and the effective cooling structure can be realized.

According to the thirteenth aspect of the invention, the motor is the brushless DC motor, and the control circuit is the inverter circuit which drives the brushless DC motor. Therefore, it is not necessary to install the inverter circuit on the rear side of the motor in the housing body portion, and the space required on the rear side of the conventional motor can be reduced, so that an electric power tool having a compact front-rear length of the body portion can be realized.

According to the fourteenth aspect of the invention, the motor is the brushed DC motor, and the control circuit includes the output transistor for protecting the brushed DC motor. Since the cooling structure for the output transistor in this brushed DC motor can be added, the operation of the electric power tool which is high in reliability can be ensured.

According to the fifteenth aspect of the invention, since the commutating plate for commutating the air flow is provided in the handle portion of the housing, the flow of air in the housing can be made smooth, so that the cooling efficiency can be enhanced.

According to the sixteenth aspect of the invention, since the guide passage in which the air flow passes is formed in the board or around the board, an electron element mounted on the board can be effectively cooled.

According to the seventeenth aspect of the invention, since the heat-insulating material is provided on the inner wall or the outer wall of the handle portion in the housing, it is possible to reduce transmission of the heat generated by the switching element in the handle portion to a hand of an operator gripping the handle portion, so that the operator can perform working comfortably.

According to the eighteenth aspect of the invention, since the air inlet/outlet is provided on the side surface on the housing rear side, the air exhausted from the housing inside does not blow on the operator, so that the operator can perform working comfortably. Further, also under such an environment as to generate dust during a cutting operation, the dust becomes difficult to enter the housing inside from the air inlet/outlet.

According to the nineteenth aspect of the invention, since the filter for filtering the air is provided for the air intake, it is possible to prevent effectively the dust from entering the housing inside.

DESCRIPTION OF EMBODIMENTS

Figure 1:
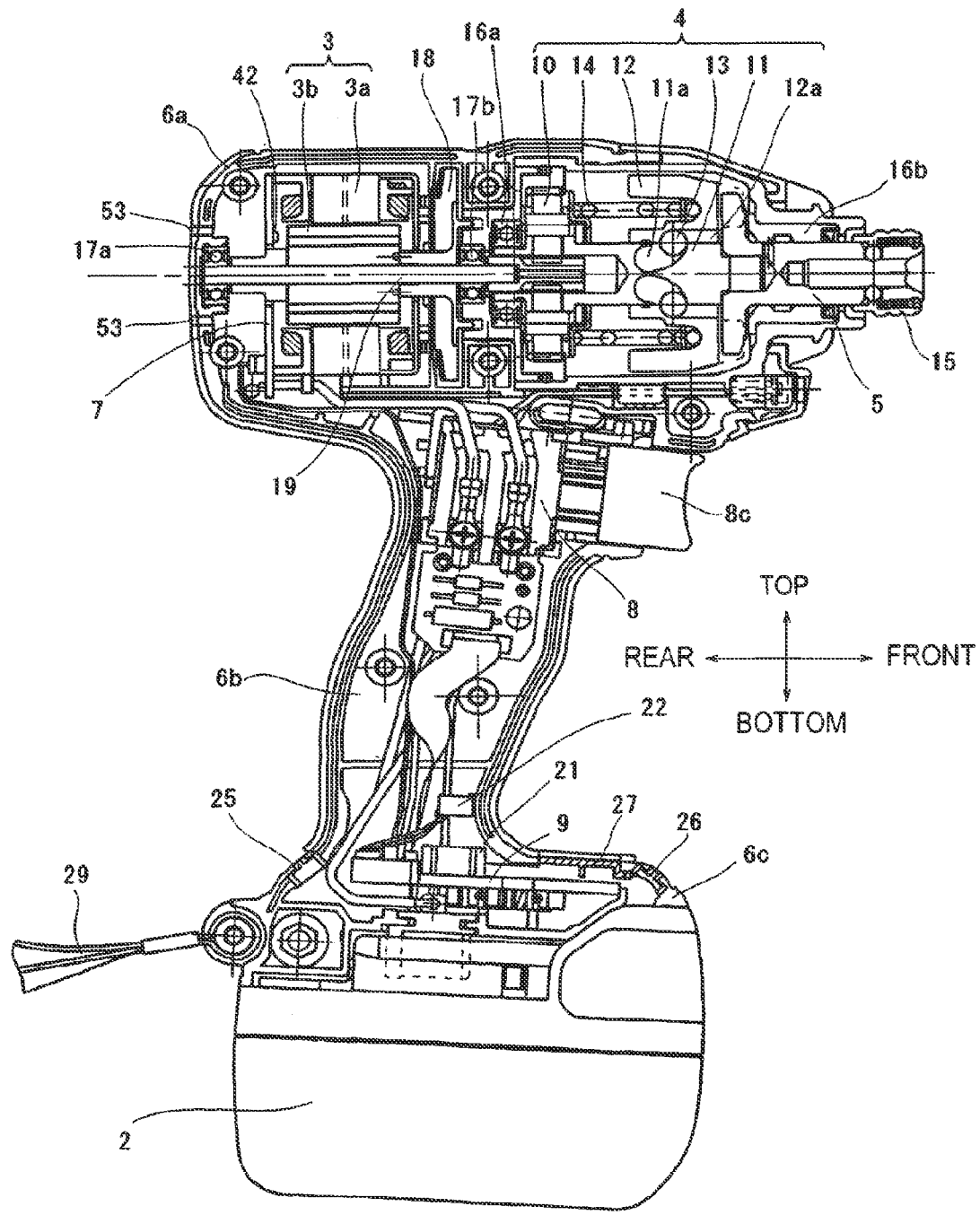
FIG. 1 is a diagram showing the internal structure of an impact driver according to an embodiment of the invention.

An embodiment of the invention will be described below with reference to FIGS. 1 to 3. It should be noted that an top-bottom direction and a front-rear direction in the following description represent directions shown in FIG. 1. FIG. 1 is a diagram showing the internal structure of an impact driver 1 as one embodiment of an electric power tool according to the invention. The impact driver 1, with a chargeable battery 2 as a power source, drives a rotary impact mechanism 4 by means of a motor 3 as a drive source, and gives rotational force and impact force to an anvil 5 that is an output shaft, thereby to deliver intermittently the rotary impact force to a not-shown tool such as a driver bit and perform the screwing or bolting operation.

The motor 3 is a brushless DC motor, which is accommodated in a cylindrical body portion 6a of a housing 6 having the nearly T-shape in side view. A rotational shaft 19 of the motor 3 is held rotatably by a bearing 17a provided on the rear end side of the body portion 6a and a bearing 17b provided near the central portion of the body portion 6a. In front of the motor 3, a fan 18 is provided, which is attached to the rotational shaft 19 and rotates in synchronization with the motor 3. By the fan 18, the air is sucked from an air intake 53 provided at the rear of the body portion 6a, and exhausted to the outside of the housing 6 from plural slits (not shown) arranged around the fan 18. At the rear of the motor 3, there is provided a board 7 which mounts thereon a position detecting element 42 for performing connection to a drive coil of the motor 3 and detecting a rotary position of a rotor 3b.

At the upper portion inside a grip portion 6b extending integrally from the body portion 6a of the housing 6 at a substantially right angle, there is provided a trigger switch 8. A trigger operating portion 8c which is urged by a not-shown spring and protrudes from the grip portion 6b is provided for the trigger switch 8. At the lower portion inside the grip portion 6b, a control circuit board 9 is accommodated, which has a function of controlling the speed of the motor 3 by the pulling operation of the trigger operating portion 8c. On this control circuit board 9, six switching elements 21 are further mounted, and these switching elements 21 perform inverter control thereby to rotate the motor 3. Above the switching element 21, a small-sized electric fan 22 is attached. The details of the drive circuit board 7, the switching element 21 and the electric fan 22 will be described later. To a battery retaining portion 6c located below the grip portion 6b, the battery 2 such as a nickel metal hydride battery or a lithium-ion battery is detachably attached.

The rotary impact mechanism 4 includes a planetary gear reduction mechanism 10, a spindle 11, and a hammer 12. When the trigger operating portion 8c of the trigger switch 8 is pulled and the motor 3 is actuated, the rotation of the motor 3 is speed-reduced by the planetary gear reduction mechanism 10 and the speed-reduced rotation is transmitted to the spindle 11, whereby the rotation of the spindle 11 is driven at the predetermined speed. The spindle 11 and the hammer 12 are coupled to each other by a cam mechanism. This cam mechanism includes a V-shaped spindle cam groove 11a formed on the outer peripheral surface of the spindle 11, a hammer cam groove 12a formed on the inner peripheral surface of the hammer 12, and a ball 13 which engages with these cam grooves 11a and 12a.

The hammer 12 is always urged forward by a spring 14, and located, in the static time, by the engagement between the ball 13 and the cam grooves 11a, 12a in a position spaced from the end surface of the anvil 5. At two places on each of rotary planes of the hammer 12 and the anvil 5 opposed to each other, not-shown convex portions are formed symmetrically.

When the rotation of the spindle 11 is driven, its rotation is transmitted through the cam mechanism to the hammer 12. Before the hammer 12 rotates half, the convex portion of the hammer 12 engages with the convex portion of the anvil 5, whereby the anvil 5 is rotated. When relative rotation is produced between the spindle 11 and the hammer 12 by engagement reaction at that time, the hammer 12 starts to retreat to the motor 3 side along the spindle cam groove 11a of the cam mechanism while compressing the spring 14.

When the convex portion of the hammer 12 gets over the convex portion of the anvil 5 by the retreat of the hammer 12 and their convex portions are disengaged, the hammer 12, while being rapidly accelerated in the rotational direction and in the forward direction by elastic energy stored in the spring 14 and the action of the cam mechanism in addition to the rotational force of the spindle 11, moves forward by the urging force of the spring 14, and the convex portion of the hammer 12 engages with the convex portion of the anvil 5 again, whereby the hammer 12 and the anvil 5 start to rotate integrally. Since the strong rotary impact force is applied to the anvil 5 at this time, the rotary impact force is transmitted to a screw through a not-shown tool attached to the anvil 5.

Afterward, the similar operation is repeated and the rotary impact force is repeatedly transmitted from the tool to the screw intermittently, so that the screw is fastened into a not-shown fastened material such as wood.

Figure 2:
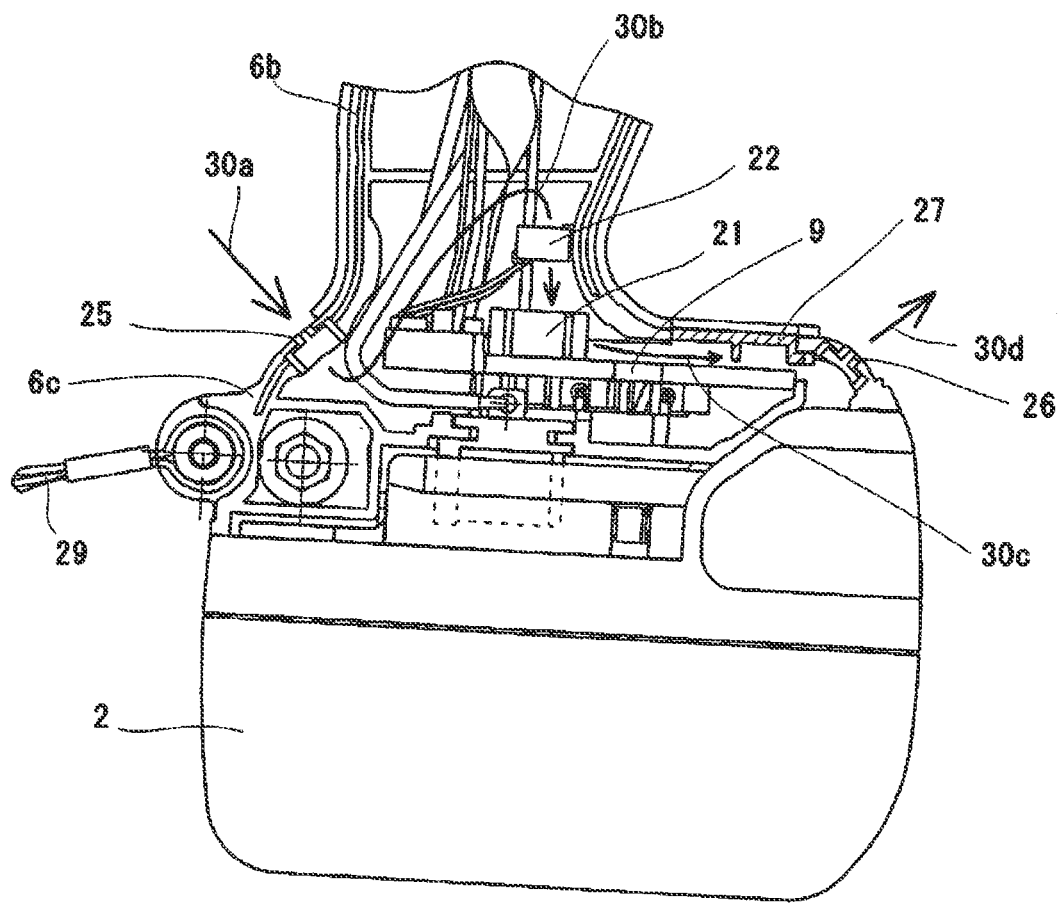
FIG. 2 is an enlarged sectional view in the vicinity of an attachment portion of a control circuit board 9 in FIG. 1.

FIG. 2 is an enlarged sectional view in the vicinity of an attachment portion of the control circuit board 9 in FIG. 1. Above the switching element 21 mounted on the control circuit board 9, the small-sized electric fan 22 is provided. By rotation of this electric fan 22, the external air is introduced from an air inlet 25 formed in the battery retaining portion 6c of the housing 6 to the direction of an arrow 30a, and thereafter flows in a passage shown by an arrow 30b. Then, by the electric fan 22, the strong air flow is blown in the switching element 21. Generally, the switching element 21 such as FET for electric power has frequently a heat radiating plate on its back surface. In this embodiment, the air flow is actively brown in its heat radiating plate. Further, another heat radiating unit made of aluminum may be attached to the heat radiating plate of the switching element 21 to blow the air flow also in its heat radiating unit.

The air warmed by the heat of the switching element 21 is exhausted from the direction of an arrow 30c through an air outlet 26 formed on the front side of the battery retaining portion 6c of the housing 6 to the direction of an arrow 30d.

The air inlet 25 is arranged on the rear side of the impact driver 1, and the air outlet 26 is arranged on the front side thereof. This is because: since there is more dust on the front side of the impact driver 1 than on the rear side due to generation of cut pieces, the dust is prevented from entering the inside. Further, if the air outlet 26 is located on the rear side of the impact driver, since the exhausted air blows in the operator, the air outlet 26 is arranged on the front side in the embodiment. The air intake 26 and the air outlet 26 may be simply holes but a net or a filter may be attached to them in order to prevent intrusion of the dust and dirt.

The invention is characterized in not only that the rotation of the electric fan 22 is cooperated with the pulling operation of the trigger 8c but also that such control is performed that the electric fan 22 remains rotated also after releasing of the trigger 8c according to the temperature of the switching element 21. In the conventional power tool, by means of air flow generated by the fan 18 constituted coaxially with the motor 3, the switching element 21 is cooled. Accordingly, regardless of the temperature of the switching element 21, as soon as the rotation of the motor 3 is stopped by releasing the trigger 8*c*, the fan is also stopped. Therefore, there is fear that the temperature of the switching element 21 becomes higher than assumption and the life of the switching element 21 is shortened. Particularly, in products as the electric power tool, in which the rotation of the rotor 3*b* can be locked, such as a driver drill and a disc grinder, the fan attached to the rotational shaft 19 does not rotate when the rotation is locked. Therefore, there is fear that the switching element 21 cannot be cooled enough.

Figure 3:
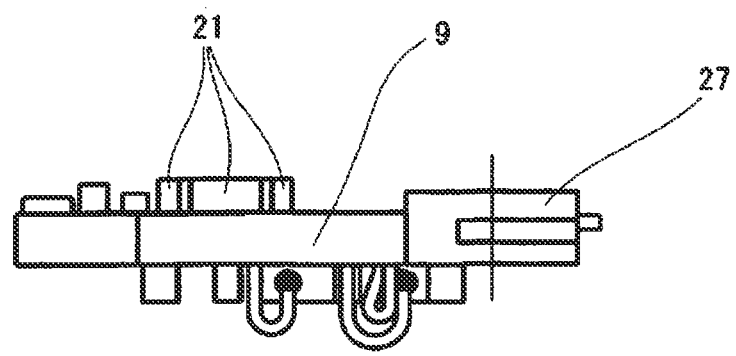
FIG. 3 is a side view of a control circuit board 9 shown in FIG. 1, seen from the side.
Figure 4:
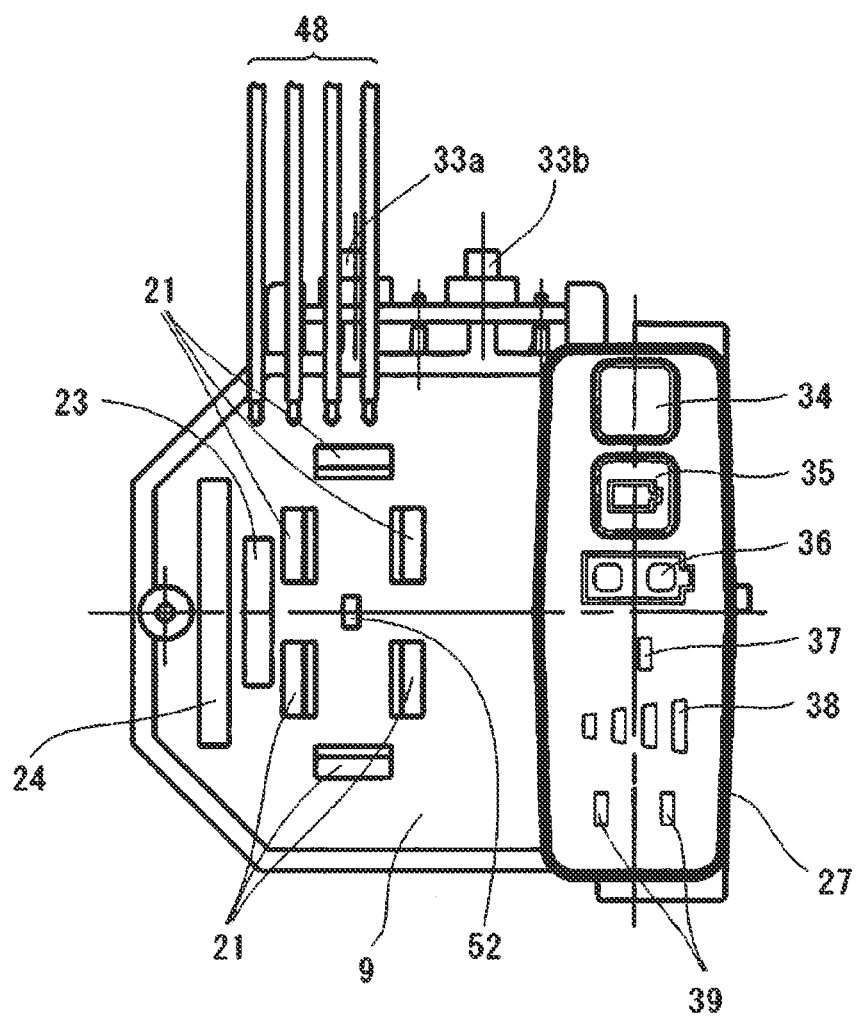
FIG. 4 is a top view of the control circuit board 9 shown in FIG. 1, seen from the upside.

FIG. 3 is a side view of the control circuit board 9 shown in FIG. 1, seen from the side, and FIG. 4 is a top view of the control circuit board 9, seen from the upside. On the control circuit board 9, the six switching elements 21 are mounted in the vertical direction to the control circuit board 9, that is, mounted so that the height direction of the switching element 21 becomes the top-bottom direction. By thus arranging the switching element 21, mounting efficiency on the board improves. Therefore, in case that the switching element 21 is arranged in the grip portion 6*b* of which diametrical size is limited, the above mounting is suitable. In a central portion of the six switching elements 21, a temperature sensor 52 is provided, by which the temperature around the switching elements 21 is detected. The detected temperature is monitored by a temperature increase measuring circuit 45 which will be described later.

The control circuit board 9 has the shape corresponding to the upper surface shape of the battery 2. To the front side on the upper surface of the control circuit board 9, a control panel 27 exposed to the upper surface of the battery retaining portion 6*c* is attached. On the control panel 27, various operational buttons and display lamps are mounted. A light button 34 is a light touch switch. By pushing this button, a white LED light attached to the impact driver 1 can be switched on and off. A battery-level button 35 is a light touch switch. The operator can confirm, in a battery-level display lamp 36 which displays a battery mark, by pushing this button 35, the level of the remaining battery. The battery level indicates any of three levels; "Full charge (lighting of two LED's)", "About half (lighting of one LED), and "Small (no lighting of two LED's). A display lamp 37 is LED which lights up while the electric fan 22 is operating. Hereby, the operator can know that the electric fan 22 is operating and cooling is being performed. A strength display lamp 38 is a lamp for displaying strength of the tightening torque set by a strength switch 33*a*, which displays, in the lighting number of the LED's, the set level of four levels (for example, 2600, 2000, 1200, 500 times/min.) representing the rotation number of the motor 3. A single/barrage shot display lamp 39 shows either of a single shot mode and a barrage shot mode which are switched by pushing a single/barrage shot switch 33*b*. In the single shot mode, after the impact driver has been actuated by pulling the trigger operating switch 8*c*, the impact driver stops automatically at several times (one to four times) of striking. In the barrage shot mode, after the impact driver has been actuated by pulling the trigger operating switch 8*c*, the impact driver operates continuously (does not stop automatically).

On the rear side of the control circuit board 9, as shown in FIG. 4, connectors 23 and 24 are provided. Through the connector 24, a switching element drive signal is input from a control signal output circuit described later. Further, through the connector 53, the control circuit board 9 is connected to the trigger switch 8.

Figure 5:
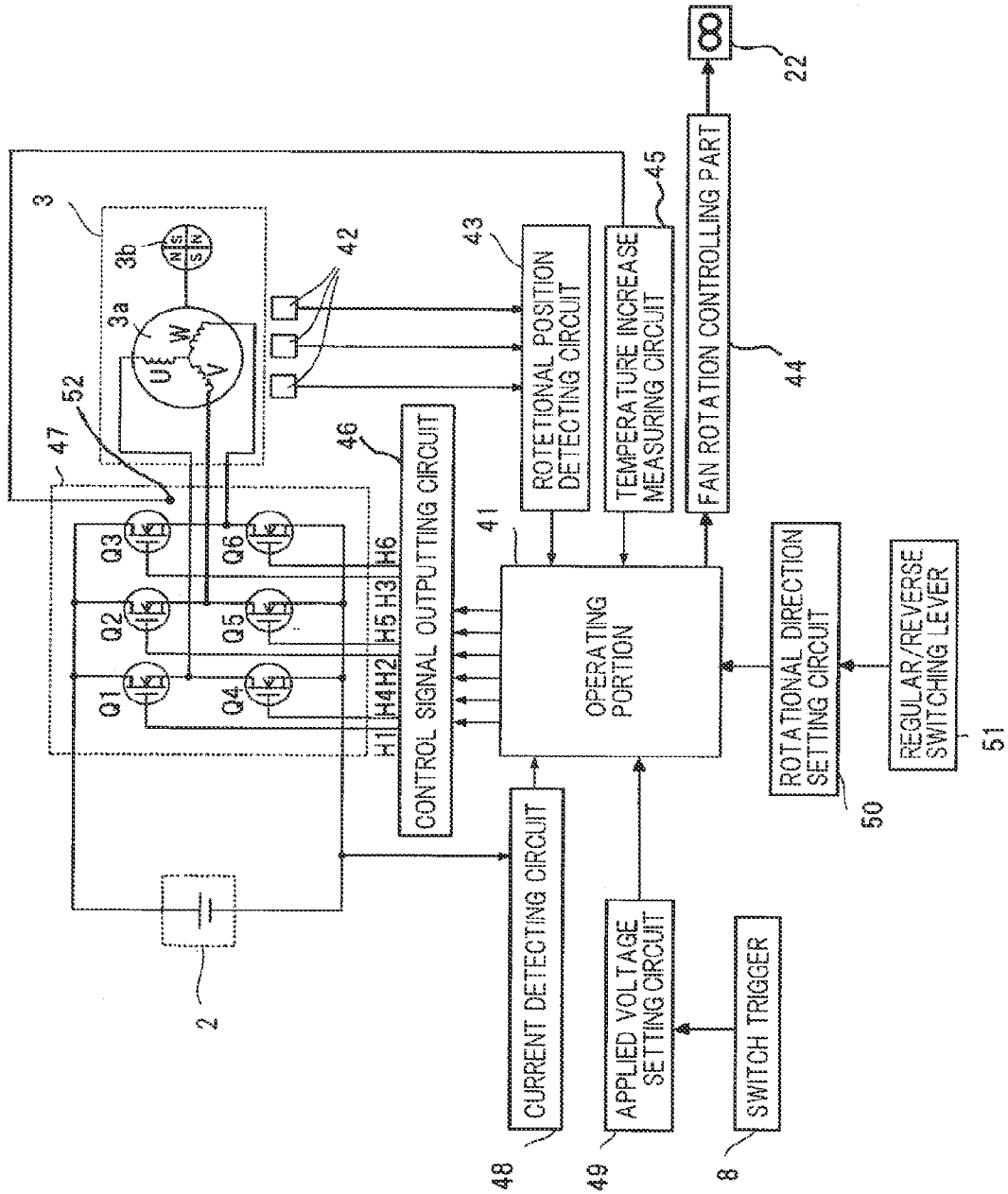
FIG. 5 is a block diagram showing the configuration of a drive control system of a motor 3 in FIG. 1.

Next, the configuration and working of a drive control system of the motor 3 will be described with reference to FIG. 5. FIG. 5 is a block diagram showing the configuration of the motor drive control system. In the embodiment, the motor 3 is composed of a three-phase brushless DC motor. This brushless DC motor is a so-called inner rotor type, which includes the rotor 3*b* including a permanent magnet (magnet) including plural sets (two sets in the embodiment) of N-pole and S-pole, the stator 3*a* composed of star-connected three-phase stator winding U, V, W, and three rotary position detecting elements (hall elements) 42 which are arranged in the circumferential direction at predetermined intervals, for example, at intervals of an angle of 60° in order to detect the rotary position of the rotor 3*b*. On the basis of position detecting signals from these rotary position detecting elements 42, the power input direction and power input time to the stator windings U, V, W are controlled, and the rotor 3 rotates. The rotary position detecting element 42 is arranged in a position opposed to the magnet of the rotor 3*b* on the board 7.

As electronic elements mounted on the control circuit board 9, six switching elements Q1 to Q6 such as FET's (Field Effect Transistors) connected in three-phase bridge are included. Each gate of the six bridge-connected switching elements Q1 to Q6 is connected to a control signal output circuit 46 mounted on the control circuit board 9, each drain or each source of the six switching elements Q1 to Q6 is connected to the star-connected stator windings U, V, W. Hereby, the six switching elements Q1 to Q6 perform the switching operation on the basis of switching element drive signals (drive signals of H4, H5, H6 and the like) inputted from the control signal output circuit 46, and transform the direct-current voltage of the battery 2 to be applied to an inverter circuit 47 into three-phase (U-phase, V-phase and W-phase) voltages Vu, Vv, Vw to supply the electric power to the stator windings U, V and W.

A regular/reverse switching lever 51 for switching the rotational direction of the motor 3 is provided for the impact driver 1. A rotational direction setting circuit 50, every time it detects the change of the regular/reverse switching lever 51, switches the rotational direction of the motor, and transmits its control signal to the operating portion 41. The operating portion 41 includes a central processing unit (CPU) for outputting a drive signal on the basis of a processing program and data, ROM for storing the processing program and control data, RAM for storing temporarily the data, and a timer, which are not shown.

The operating portion 41 forms a drive signal for switching the predetermined switching elements Q1 to Q6 alternately on the basis of the output signals from the rotational direction setting circuit 50 and the rotator position detecting circuit 43, and outputs the drive signal to a control signal output circuit 46. Hereby, the electric power is supplied alternately to the predetermined windings of the stator windings U, V, W, thereby to rotate the rotor 3*b* in the set rotational direction. In this case, the drive signal to be applied to the negative power source side switching elements Q4 to Q6 on the drive circuit board 7 is output as a PWM signal on the basis of the output control signal from an applied voltage setting circuit 49. A value of current to be supplied to the motor 3 is measured by a current detecting circuit 48, and its measured value is fed rear to the operating portion 41, whereby the electric current to be supplied to the motor 3 is adjusted so as to become the set drive electric power. The PWM signal may be applied to the positive power source side switching elements Q1 to Q3.

The characteristic constitution in this embodiment is that: the temperature sensor 52 for measuring the temperature of the switching element 21 is provided in the inverter circuit 47, and the temperature of the switching element 21 or the temperature around the switching element 21 is always monitored by the temperature increase measuring circuit 45. The temperature of the switching element 21 is measured by the temperature increase measuring circuit 45, and the measured value is outputted to an operating portion 41. The operating portion 41, when it decides that the temperature becomes a preset reference value and more, sends a signal to a fan rotation controlling part 44 and rotates the electric fan 22. Similarly, the operating portion 41, regardless of the existence of rotation of the motor 3, may control ON/OFF of the rotation of the electric fan 22 according to the measured temperature of the switching element 21. The speed at which the electric fan 22 is rotated may be controlled not only in one-step but also in two-step of low speed/high speed, or continuously and variably. The electric fan 22 can use the electric power supplied from the battery 2 which is not shown in FIG. 5.

Figure 6:
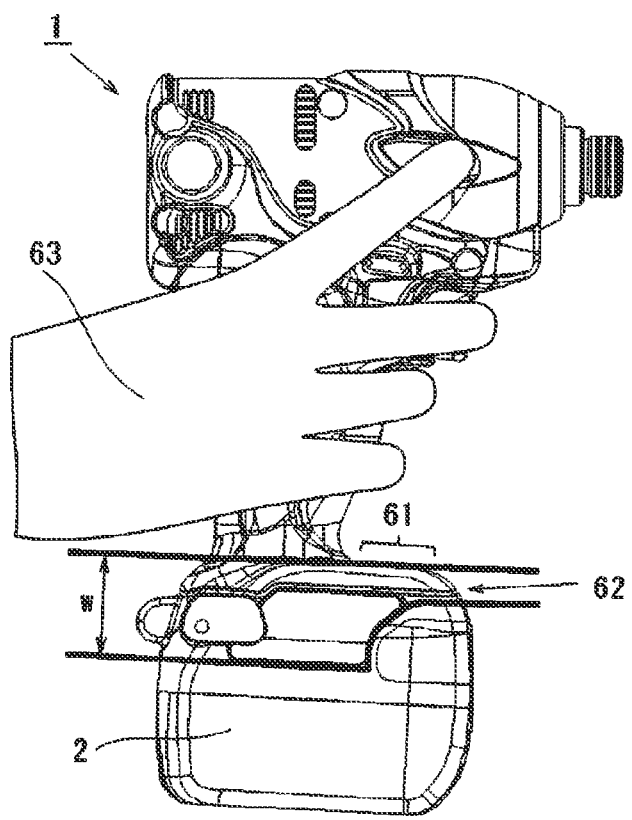
FIG. 6 is a side view showing a state when the impact driver 1 according to the embodiment of the invention is used.

FIG. 6 shows a state when the impact driver 1 according to the embodiment is used. In FIG. 6, the operator grips the grip portion 6b of the housing 6 with his right hand. In this figure, though the trigger 8c is operated with a middle finger of his right hand, the trigger 8c may be operated with a forefinger. At this time, as understood from this figure, in the battery retaining portion 6c, that is, the side surface portion in a range W between thick lines is the area not gripped with the operator's hand, or not touched with his hand. It is better that an air inlet and an air outlet are provided at any place not on the upper surface of this battery retaining portion 6c but on the side surface thereof. In the embodiment, on a side surface 62 on the front side and a side surface on the rear side, the air inlet 25 and the air outlet 26 are provided. Also in this case, there is no fear that the air inlet and the air outlet are occluded by the operator's hand. Therefore, the cooling effect by the electric fan 22 can be effectively kept. Further, it is preferable that the air inlet 25 and the air outlet 26 are provided not on the same side surface but on the opposite sides, because a wind passage is short and the flow of air generated by the electric fan 22 becomes smooth. However, also in case that they are provided on the same side in relationship of space, the advantages of the invention can be obtained.

Further, even at an area 61 on the upper surface side of the battery retaining portion 6c, as long as its area is apart from the grip portion 6b, for example, in the vicinity of the front side on the upper surface, the air inlet or the air outlet may be provided, because there is few possibility that the air inlet or the air outlet is occluded by the operator's hand there.

Figure 7:
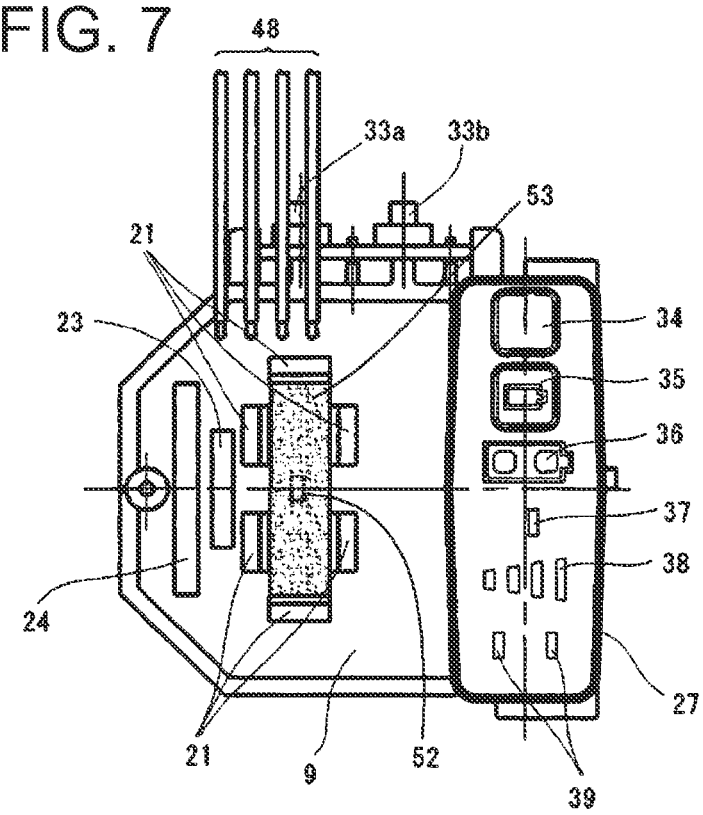
FIG. 7 is a top view of a control circuit board 9, showing a second embodiment of the invention.

FIG. 7 is a top view of a control circuit board 9 showing a second embodiment. In the second embodiment, compared with the structure shown in FIG. 4, there is provided a heat radiating unit 53 having the size abutting on the back surface of each switching element 21. The heat radiating unit 53 is, for example, a heat sink made of aluminum, in which many fins are formed. The switching element 21 is screwed to the heat radiating unit 53 by inserting a screw into a hole formed in the heat radiating plate of the switching element. Further, the heat radiating plate of the switching element 21 and the heat radiating unit 53 may be simply brought into contact with each other. By arranging each part so that the air flow sent by the electric fan 22 blows directly in the heat radiating unit 53, the switching element 21 can be efficiently cooled. Further, by attaching a temperature sensor 52 to the heat radiating unit 53, the increasing state of temperature of the switching element 21 can be detected more precisely.

As described above, according to the invention, since the brushless DC motor is used, and the switching element 21 is not arranged on the rear end side of the motor but arranged in another place, the front-rear length of the body portion of the housing 6 is shortened, whereby an electric power tool which is compact as a whole can be realized.

In the above embodiments, though the example in which the electric power tool of the invention is applied to the impact driver has been described, the invention can be similarly applied also to another arbitrary power tool which can use a brushless DC motor as a motor that is a drive source. Further, in the above embodiments, though the example in which FET is used as the switching element has been described, also in case that another type output transistor element such as IGBT (Insulated Gate Bipolar Transistor) is used, the invention can be similarly applicable.

Figure 8:
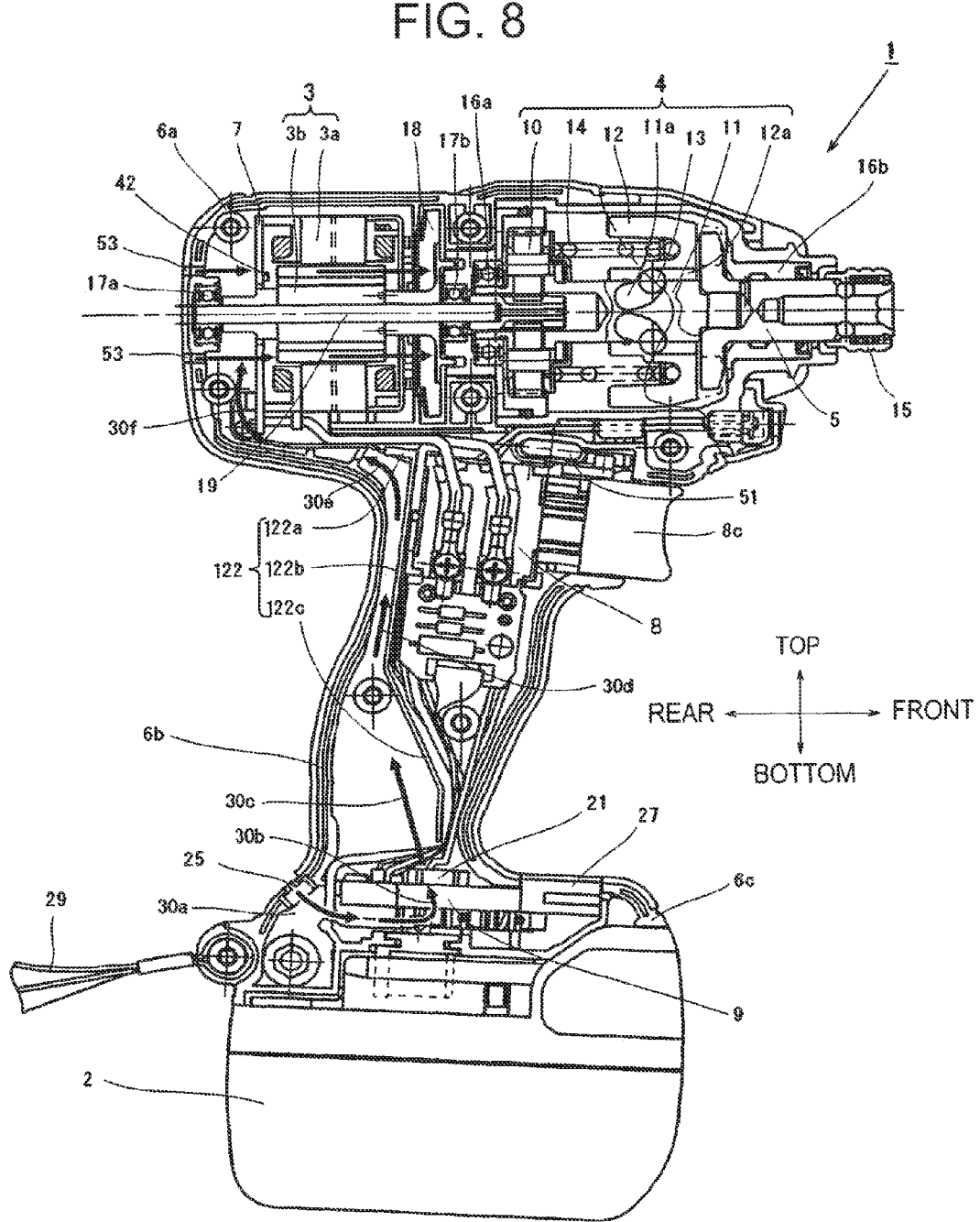
FIG. 8 is a diagram showing the internal structure of an impact driver according to a first embodiment of the invention.

An embodiment of the invention will be described below with reference to FIGS. 8 to 10. It should be noted that an top-bottom direction and a front-rear direction in the following description represent directions shown in FIG. 8. FIG. 8 is a diagram showing the internal structure of an impact driver 1 as one embodiment of an electric power tool according to the invention. The impact driver 1, with a chargeable battery 2 as a power source, drives a rotary impact mechanism 4 by means of a motor 3 as a drive source, and gives rotational force and impact force to an anvil 5 that is an output shaft, thereby to deliver intermittently the rotary impact force to a not-shown tool such as a driver bit and perform the screwing or bolting operation.

The motor 3 is a brushless DC motor, which is accommodated in a cylindrical body portion 6a of a housing 6 having the nearly T-shape in side view. A rotational shaft 19 of the motor 3 is held rotatably by a bearing 17a provided on the rear end side of the body portion 6a and a bearing 17b provided near the central portion of the body portion 6a. At the rear of the motor 3, there is provided a board 7 which mounts thereon a position detecting element 42 for performing connection to a drive coil of the motor 3 and detecting a rotary position of a rotor 3b.

At the upper portion inside a grip portion 6b extending integrally from the body portion 6a of the housing 6 at a substantially right angle, there are provided a trigger switch and a forward/reverse switching lever 51. A trigger operating portion 8c which is urged by a not-shown spring and protrudes from the grip portion 6b is provided for the trigger switch 8. At the lower portion inside the grip portion 6b, a control circuit board 9 is accommodated, which has a function of controlling the speed of the motor 3 by the pulling operation of the trigger operating portion 8c. On this control circuit board 9, six switching elements 21 are further mounted, and these switching elements 21 perform inverter control thereby to rotate the motor 3. To a battery retaining portion 6c located below the grip portion 6b, the battery 2 such as a nickel metal hydride battery or a lithium-ion battery is detachably attached.

In front of the motor 3, a fan 18 is provided, which is attached to the rotational shaft 19 and rotates in synchronization with the motor 3. By the fan 18, the air is sucked from an air intake 153 provided at the rear of the body portion 6a as shown by an arrow leading from the rear side to the front side, and exhausted to the outside of the housing 6 from plural slits (not shown) formed in the body portion 6a of the housing 6 and near the peripheral side in a radius direction of the fan 18. Further, by the rotation of the fan 18, the external air is sucked from an air inlet/outlet 125 formed in the battery retaining portion 6c of the battery 6 to a direction of an arrow 30a. Thereafter, the sucked external air flows in a passage shown by an arrow 30b, and near the control circuit board 9, thereby to cool the switching element 21 such as FET for electric power mounted on the control circuit board 9. Though the switching element 21 has frequently a heat radiating plate on the back surface thereof, another heat radiating unit made of aluminum may be attached to its heat radiating plate to make the air flow 30b blow actively in its heat radiating unit.

Inside the grip portion 6b of the housing 6, a wind guide plate 122 is formed, which includes a lower guide wall 122c which widens an opening downward and narrows a flowing passage upward, a central wall 122b which forms a flowing passage having a fixed width near the center, and a upper guide wall 122a which guides at the upper side the air flow in the predetermined direction. The air which has cooled the element mounted on the control circuit board 9 passes through the passages shown by arrows 30c, 30d, 30e and 30f, and joins the air sucked from the air intake 153. Therefore, in a wall partitioning the grip portion 6b and the body portion 6a, a hole or an opening for ventilation is formed. Further, in FIG. 8, though the air intake 153 is formed in the body portion 6a of the housing 6, plural slits may be formed in addition to this air intake 153 at the area around the board 7 in the housing 6. It is better that the shape and arrangement position of the hole for suction and slit formed in the housing 6 are set so that the air flow to be sucked from the air inlet/outlet 125 formed in the batter retaining portion 6c of the housing 6 can be effectively generated.

The air inlet/outlet 125 is arranged on the rear side of the impact driver 1. This is because: since there is more dust on the front side of the impact driver 1 than on the rear side due to generation of cut pieces, the dust is prevented from entering the inside as much as possible. The air inlet/outlet 125 may be simply a hole but a net or a filter may be attached to the air inlet/outlet 125 in order to prevent intrusion of the dust and dirt.

The rotary impact mechanism 4 includes a planetary gear reduction mechanism 10, a spindle 11, and a hammer 12. When the trigger operating portion 8c of the trigger switch 8 is pulled and the motor 3 is actuated, the rotation of the motor 3 is speed-reduced by the planetary gear reduction mechanism 10 and the speed-reduced rotation is transmitted to the spindle 11, whereby the rotation of the spindle 11 is driven at the predetermined speed. The spindle 11 and the hammer 12 are coupled to each other by a cam mechanism. This cam mechanism includes a V-shaped spindle cam groove 11a formed on the outer peripheral surface of the spindle 11, a hammer cam groove 12a formed on the inner peripheral surface of the hammer 12, and a ball 13 which engages with these cam grooves 11a and 12a.

The hammer 12 is always urged forward by a spring 14, and located, in the static time, by the engagement between the ball 13 and the cam grooves 11a, 12a in a position spaced from the end surface of the anvil 5. At two places on each of rotary planes of the hammer 12 and the anvil 5 opposed to each other, not-shown convex portions are formed symmetrically.

When the rotation of the spindle 11 is driven, its rotation is transmitted through the cam mechanism to the hammer 12. Before the hammer 12 rotates half, the convex portion of the hammer 12 engages with the convex portion of the anvil 5, whereby the anvil 5 is rotated. When relative rotation is produced between the spindle 11 and the hammer 12 by engagement reaction at that time, the hammer 12 starts to retreat to the motor 3 side along the spindle cam groove 11a of the cam mechanism while compressing the spring 14.

When the convex portion of the hammer 12 gets over the convex portion of the anvil 5 by the retreat of the hammer 12 and their convex portions are disengaged, the hammer 12, while being rapidly accelerated in the rotational direction and in the forward direction by elastic energy stored in the spring 14 and the action of the cam mechanism in addition to the rotational force of the spindle 11, moves forward by the urging force of the spring 14, and the convex portion of the hammer 12 engages with the convex portion of the anvil 5 again, whereby the hammer 12 and the anvil 5 start to rotate integrally. Since the strong rotary impact force is applied to the anvil 5 at this time, the rotary impact force is transmitted to a screw through a not-shown tool attached to the anvil 5. Afterward, the similar operation is repeated and the rotary impact force is repeatedly transmitted from the tool to the screw intermittently, so that the screw is fastened into a not-shown fastened material such as wood.

Figure 9:
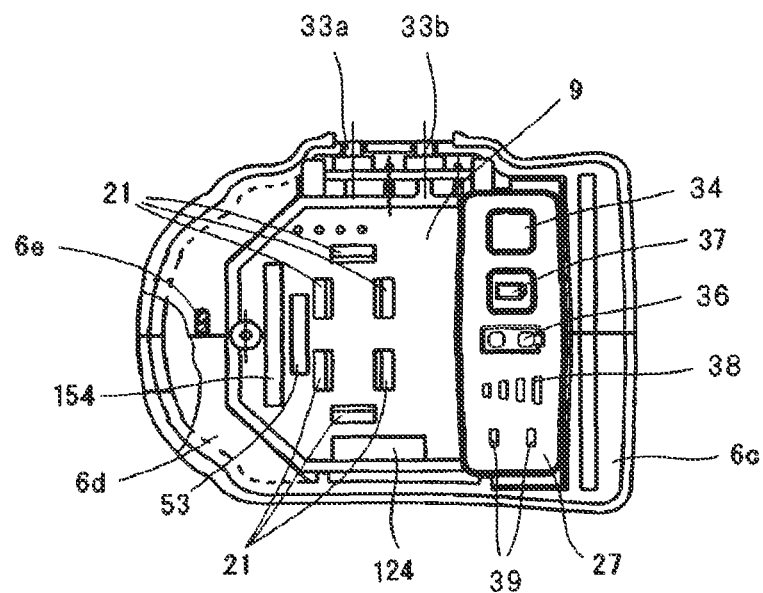
FIG. 9 is a top view seen from the upside of a control circuit board 9 shown in FIG. 8.
Figure 10:
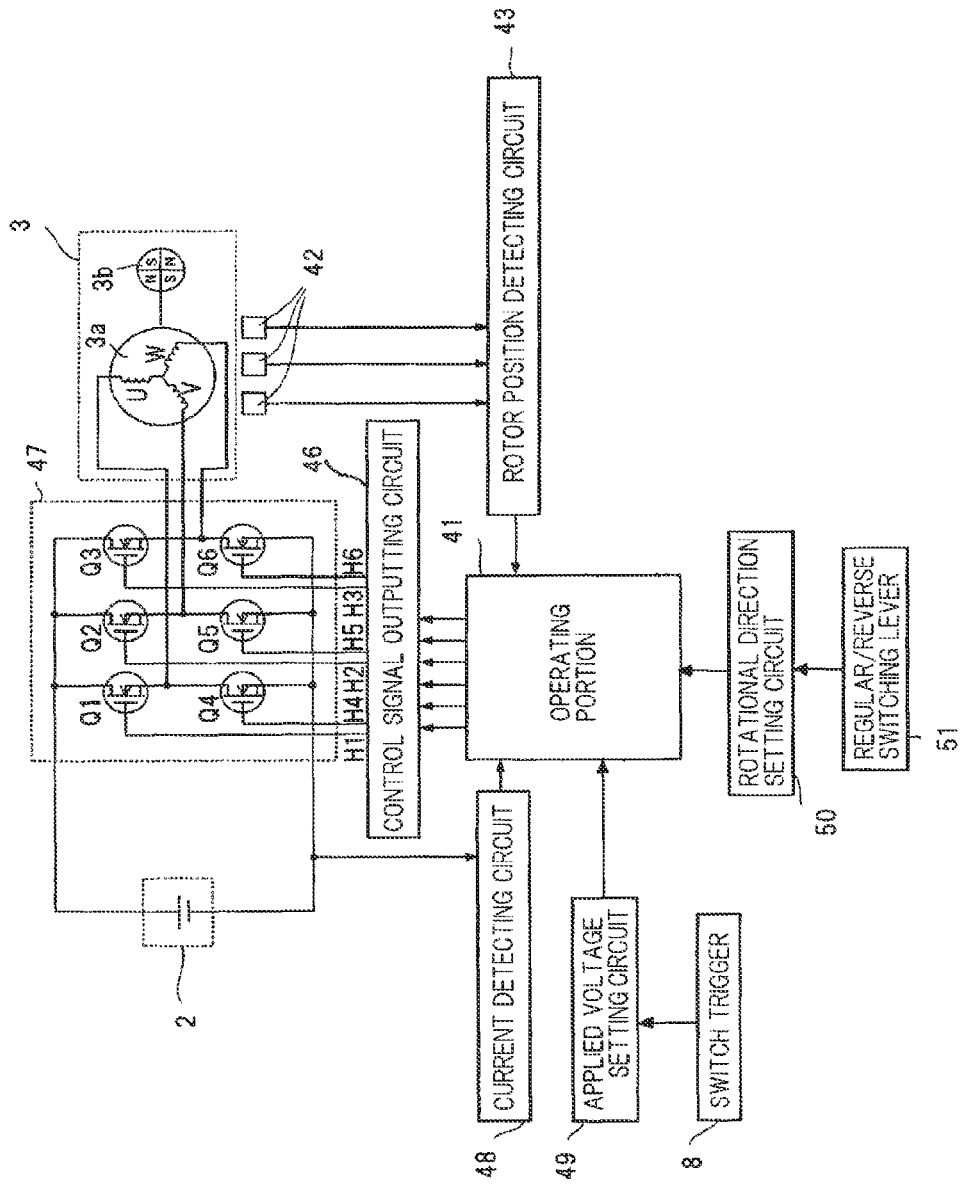
FIG. 10 is a block diagram showing the configuration of a drive control system of a motor in FIG. 8.

FIG. 9 is a top view seen from the upside of the control circuit board 9 shown in FIG. 8. In FIG. 9, not only the control circuit board 9 but also the housing 6 portion around the board 9 is shown. The control circuit board 9 is arranged on a partition wall 6d between the grip portion 6b of the housing 6 and the battery retaining portion 6c, or arranged so as to be sandwiched by this partition wall 6d. In the partition wall 6d, a through-hole 6e for inserting a power source wire is formed. On the control circuit board 9, six switching elements 21 are mounted in the vertical direction to the control circuit board 9, that is, mounted so that the height direction of the switching element 21 becomes a top-bottom direction. By thus arranging the switching element 21, mounting efficiency on the board improves. Therefore, in case that the switching element 21 is arranged in the grip portion 6b of which diametrical size is limited, the above mounting is suitable.

The control circuit board 9 has the shape corresponding to the upper surface shape of the battery 2. To the front side on the upper surface of the control circuit board 9, a control panel 27 exposed to the upper surface of the battery retaining portion 6c is attached; and in the side portion of the control circuit board 9, there is formed a notch 124 which defines a guide passage for making the air introduced from the air inlet/outlet 125 flow from the downside of the control circuit board 9 to the upside thereof. The place at which the guide passage for ventilation is formed, and the number of the guide passages to be formed in the control circuit 9 are set arbitrarily, and should be set according to the mounting element to be cooled.

On the control panel 27, various operational buttons and display lamps are mounted. A light button 36 is a light touch switch. By pushing this button, a white LED light attached to the impact driver 1 can be switched on and off. A battery-level button 37 is a light touch switch. The operator can confirm, in a battery-level display lamp 38 which displays a battery mark, by pushing this button 37, the level of the remaining battery. The battery level indicates any of three levels; "Full charge (lighting of two LED's)", "About half (lighting of one LED), and "Small (no lighting of two LED's). A strength display lamp 39 is a lamp for displaying strength of the tightening torque set by a strength switch 35a, which displays, in the lighting number of the LED's, the set level of four levels (for example, 12600, 2000, 1200, 500 times/min.) representing the rotation number of the motor 3. A single/barrage shot display lamp 40 shows either of a single shot mode and a barrage shot mode which are switched by pushing a single/barrage shot switch 35b. In the single shot mode, after the impact driver has been actuated by pulling the trigger operating switch 8c, the impact driver stops automatically at several times (one to four times) of striking. In the barrage shot mode, after the impact driver has been actuated by pulling the trigger operating switch 8c, the impact driver operates continuously (does not stop automatically).

Figure 11:
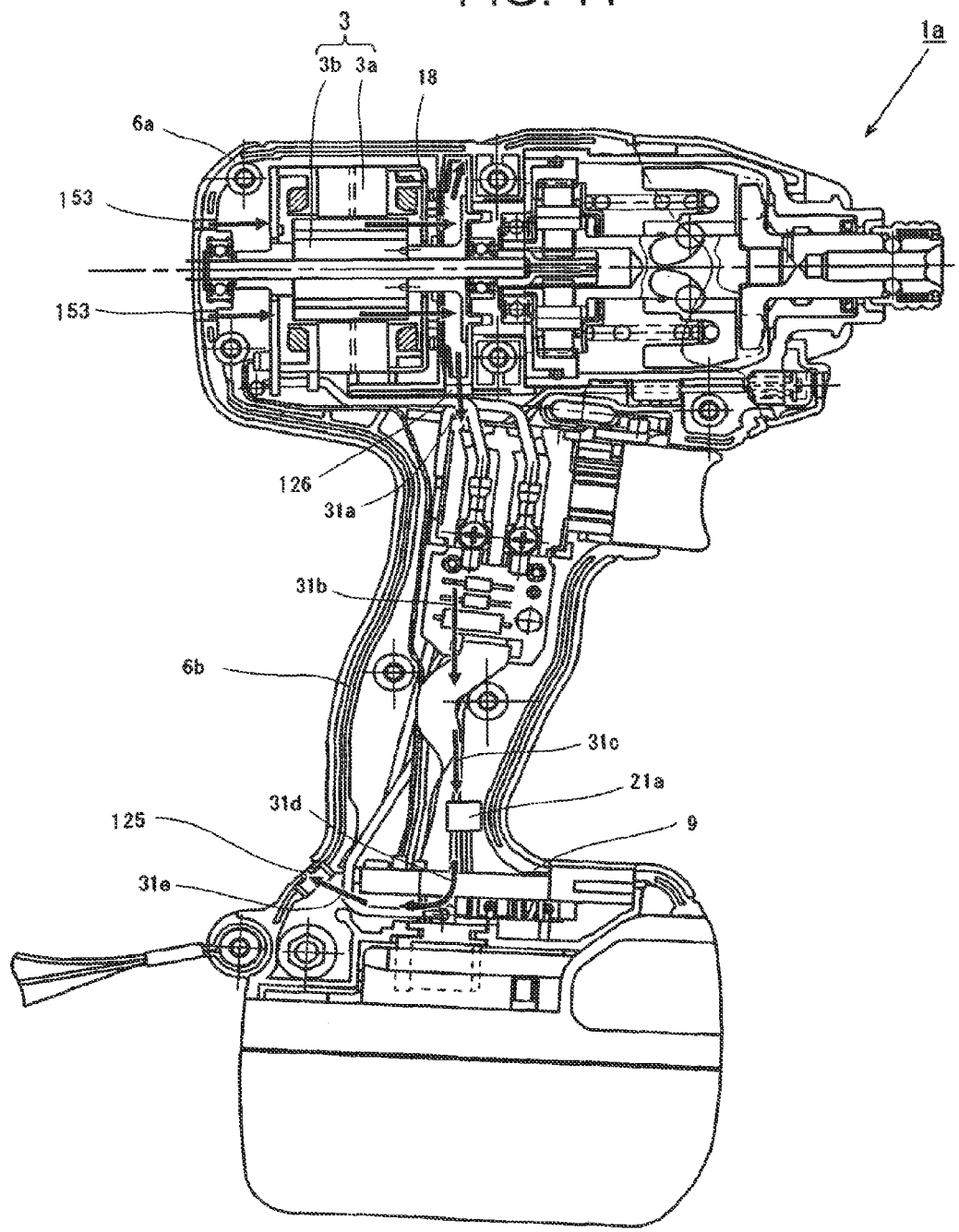
FIG. 11 is a diagram showing the internal structure of an impact driver according to a second embodiment of the invention.

On the rear side of the control circuit board 9, as shown in FIG. 11, connectors 153 and 154 are provided. Through the connector 154, a switching element drive signal is input from a control signal output circuit described later. Further, through the connector 153, the control circuit board 9 is connected to the trigger switch 8.

Next, the configuration and working of a drive control system of the motor 3 will be described with reference to FIG. 10. FIG. 10 is a block diagram showing the configuration of the motor drive control system. In the embodiment, the motor 3 is composed of a three-phase brushless DC motor. This brushless DC motor is a so-called inner rotor type, which includes the rotor 3b including a permanent magnet (magnet) including plural sets (two sets in the embodiment) of N-pole and S-pole, the stator 3a composed of star-connected three-phase stator winding U, V, W, and three rotary position detecting elements (hall elements) 42 which are arranged in the circumferential direction at predetermined intervals, for example, at intervals of an angle of 60° in order to detect the rotary position of the rotor 3b. On the basis of position detecting signals from these rotary position detecting elements 42, the power input direction and power input time to the stator windings U, V, W are controlled, and the rotor 3 rotates. The rotary position detecting element 42 is arranged in a position opposed to the magnet of the rotor 3b on the board 7.

As electronic elements mounted on the control circuit board 9, six switching elements Q1 to Q6 such as FET's (Field Effect Transistors) connected in three-phase bridge are included. Each gate of the six bridge-connected switching elements Q1 to Q6 is connected to a control signal output circuit 46 mounted on the control circuit board 9, each drain or each source of the six switching elements Q1 to Q6 is connected to the star-connected stator windings U, V, W. Hereby, the six switching elements Q1 to Q6 perform the switching operation on the basis of switching element drive signals (drive signals of H4, H5, H6 and the like) inputted from the control signal output circuit 46, and transform the direct-current voltage of the battery 2 to be applied to an inverter circuit 47 into three-phase (U-phase, V-phase and W-phase) voltages Vu, Vv, Vw to supply the electric power to the stator windings U, V and W.

Of the switching element drive signals (three-phase signal) which drive each gage of the six switching elements Q1 to Q6, the drive signals H4, H5 and H6 are supplied as pulse width modulation signals (PWM signals) to the three switching elements Q4, Q5 and Q6 on the negative power source side. By an operating portion 41 mounted on the control circuit board 9, the pulse width (duty ratio) of the PWM signal is changed on the basis of a detection signal of the operating amount (stroke) of the trigger operating portion 8a of the trigger switch 8, whereby the power supplying amount to the motor 3 is adjusted, and start/stop and rotational speed of the motor 3 are controlled.

Here, the PWM signals are supplied to either the positive power source side switching elements Q1 to Q3 on the inverter circuit 7 or the negative power source side switching elements Q4 to Q6, thereby to subject the switching elements Q1 to Q3 or the switching elements Q4 to Q6 to the high-speed switching operation, with the result that the electric power to be supplied to each stator winding U, V, W on the basis of the direct-current voltage of the battery 2 is controlled. In the embodiment, since the PWM signals are supplied to the negative power source side switching elements Q4 to Q6, the electric power to be supplied to each stator winding U, V, W can be adjusted by controlling the pulse width of the PWM signal thereby to control the rotational speed of the motor 3.

A forward/reverse switching lever 51 for switching the rotational direction of the motor 3 is provided for the impact driver 1. A rotational direction setting circuit 50, every time it detects the change of the forward/reverse switching lever 51, switches the rotational direction of the motor, and transmits its control signal to the operating portion 41. The operating portion 41 includes a central processing unit (CPU) for outputting a drive signal on the basis of a processing program and data, ROM for storing the processing program and control data, RAM for storing temporarily the data, and a timer, which are not shown.

The operating portion 41 forms a drive signal for switching the predetermined switching elements Q1 to Q6 alternately on the basis of the output signals from the rotational direction setting circuit 50 and the rotator position detecting circuit 43, and outputs the drive signal to a control signal output circuit 46. Hereby, the electric power is supplied alternately to the predetermined windings of the stator windings U, V, W, thereby to rotate the rotor 3b in the set rotational direction. In this case, the drive signal to be applied to the negative power source side switching elements Q4 to Q6 on the board 9 is output as a PWM signal on the basis of the output control signal from an applied voltage setting circuit 49. A value of current to be supplied to the motor 3 is measured by a current detecting circuit 48, and its measured value is fed back to the operating portion 41, whereby the electric current to be supplied to the motor 3 is adjusted so as to become the set drive electric power. The PWM signal may be applied to the positive power source side switching elements Q1 to Q3.

Next, with reference to FIG. 11, a second embodiment of the invention will be described. Since the basic constitution of an impact driver in the second embodiment is the same as that in the first embodiment, symbol representation to the same parts which do not make repeated reference is omitted (same as above also in the following figures). In the second embodiment, compared with the case in the embodiment shown in FIG. 8, a direction of air flow which flows in a grip portion 6b of a housing 6 is the opposite direction. In the grip portion 6b, air flow 31a, 31b, 31c which flows downward in the grip portion 6b is generated by a fan 18. This generation is achieved by leading a part of air generated by the fan 18 and usually exhausted to the outside of the housing 6, to the grip portion 6b through a through-hole 126 provided in a wall partitioning a body portion 6a of the housing 6 and the grip portion 6b. The air flow which has passed through the through-hole 126 flows as shown by arrows 31b and 31c, and is led so as to blow in a switching element 21a mounted above a control circuit board 9. In FIG. 11, although the wind guide plate 122 shown in FIG. 8 is not provided, it may be provided. The switching element 21a is attached to be located above the control circuit board 9 with space, which is different from the case in the embodiment shown in FIG. 8. This can be realized by soldering a lead wire of the switching element 21a such as FET to the control circuit board 9 in a state where the lead wire remains long. Such fixing of the switching element 21a enables the effective cooling because the area in which the switching element 21a is exposed to the air flow increases.

The air flow which has cooled the switching element 21a passes through a notch 124 formed in the control circuit board 9, flows as shown by arrows of 31d and 31e, and thereafter is exhausted from an air inlet/outlet 125 to the outside of the housing 6. This second embodiment, since the air flowing in the handle portion 6 utilizes the air exhausted from the fan 18, has a merit that the amount of the air flowing in the handle portion 6 is comparatively easy to be adjusted by adjusting the size and the shape of the through-hole 126. However, in the embodiment shown in FIG. 8, the air for cooling the switching element 21 is the external air introduced from the outside, while the air for cooling the switching element 21 is the air after cooling the motor 3 in the second embodiment and is higher in temperature than the external air. Therefore, in the second embodiment, the cooling efficiency is lower in case of the same air-flowing amount. Accordingly, in consideration of attaching importance to cooling of the motor 3 or to cooling of the switching elements 21, 21*a*, it is better that the preferred embodiment is determined.

Figure 12:
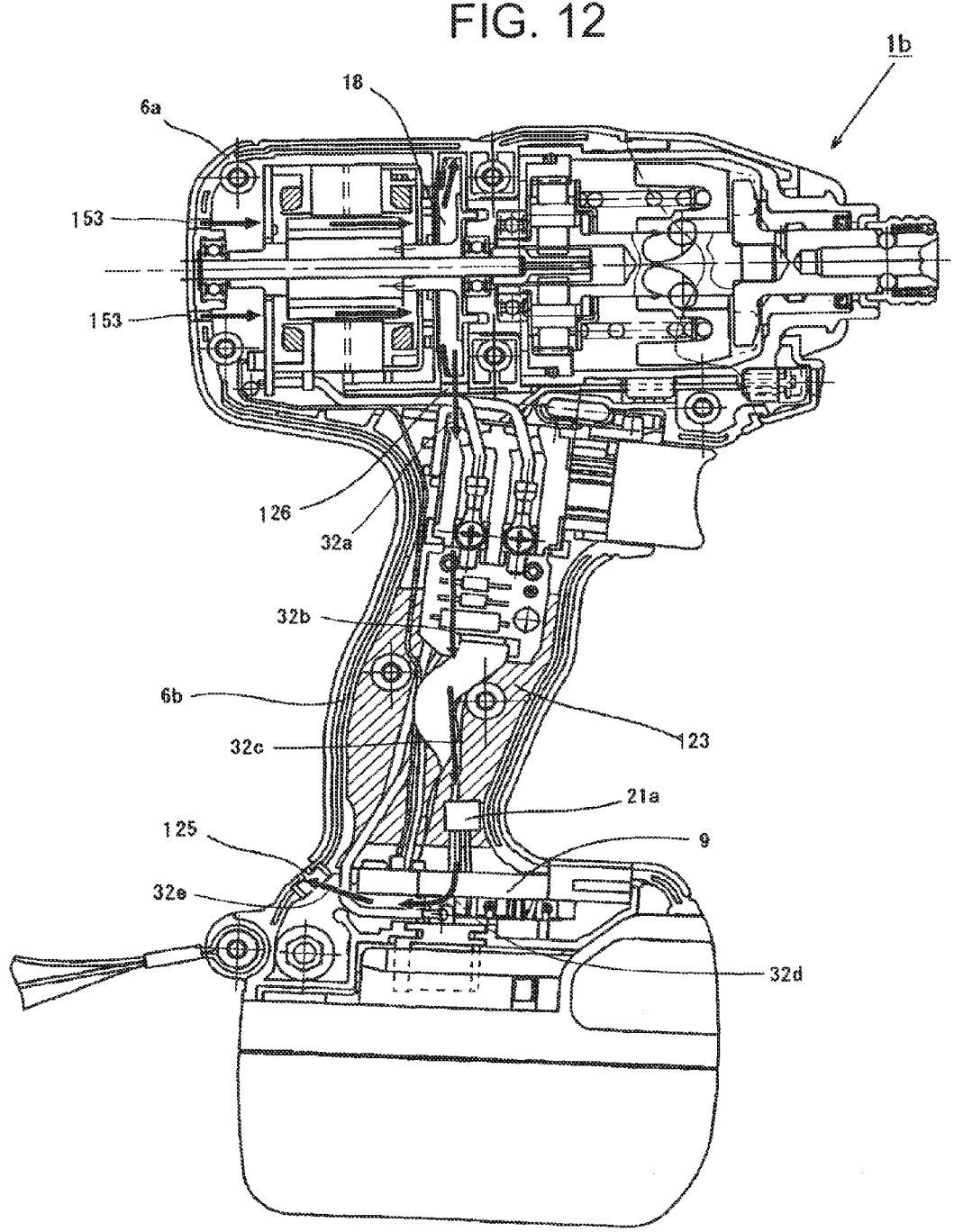
FIG. 12 is a diagram showing the internal structure of an impact driver according to a third embodiment of the invention.

Next, a third embodiment of the invention will be described with reference to FIG. 12. In the third embodiment, the direction of the air flow which flows in a grip portion 6*b* and the principle of generation of its air flow are the same as those in the second embodiment (FIG. 11). A part of air exhausted by a fan 18 is led through a through-hole 126 to the grip portion 6*b*, flows as shown by arrows of 32*a*, 32*b*, 32*c*, 32*d* and 32*e*, and thereafter is exhausted from an air inlet/outlet 125 to the outside of a housing 6. In FIG. 12, on the inner periphery side of the grip portion 6*b*, a heat insulating material 123 is disposed to prevent the grip portion 6*b* gripped by an operator from becoming hot. Though there are various materials as materials of the insulating material 123, it is preferable in order not to obstruct the flow of air flow shown by the arrows 32*b* and 32*c*, to use a material by which the inner periphery side of the grip portion 6*b* is in a smooth state. Further, the arrangement position of the heat insulating material may be on the inner wall side of the grip portion 6*b* or on the outer wall side thereof.

Figure 13:
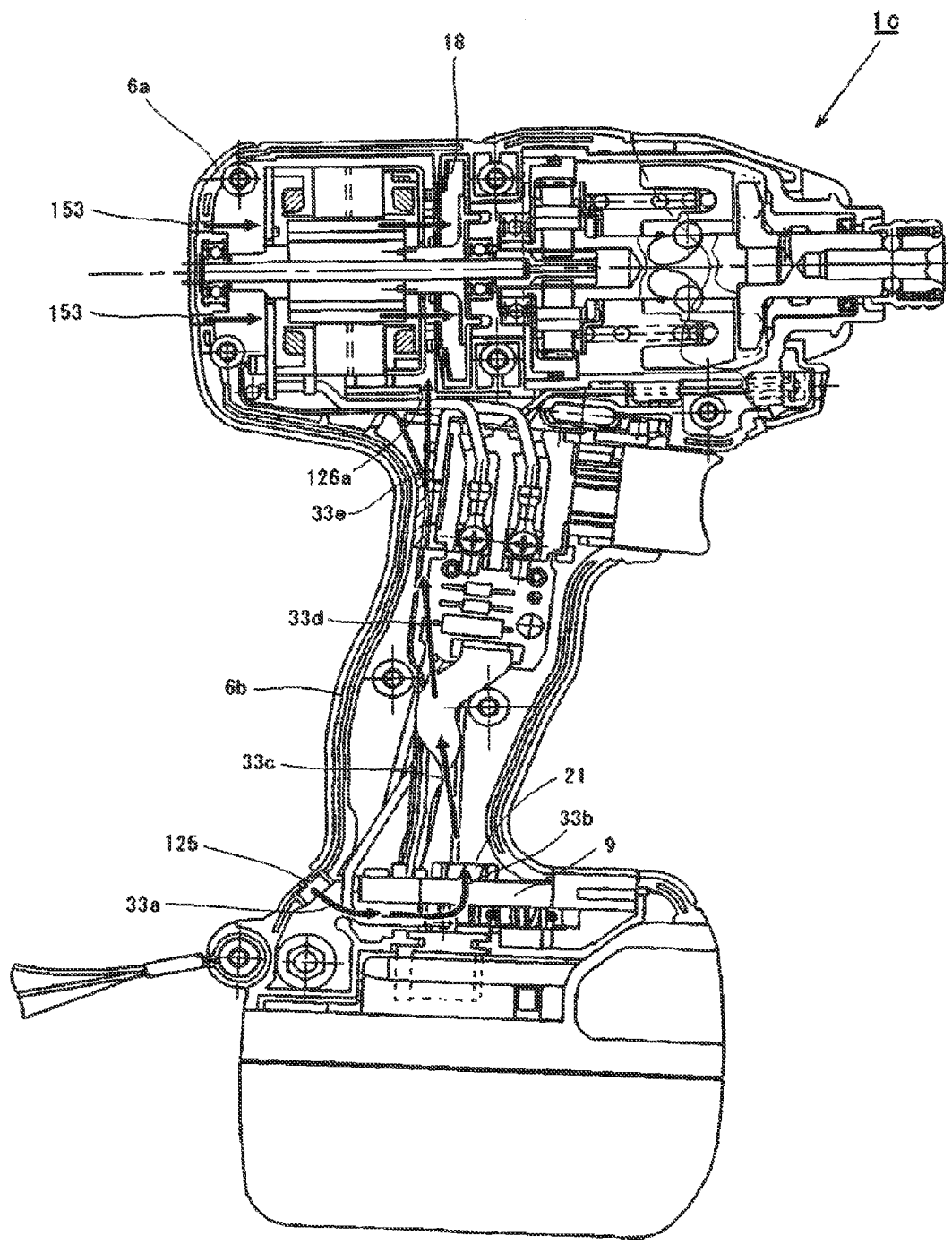
FIG. 13 is a diagram showing the internal structure of an impact driver according to a fourth embodiment of the invention.

Next, with reference to FIG. 13, a fourth embodiment of the invention will be described. The fourth embodiment is different from the first embodiment (FIG. 8) in that there is no wind guide plate 122 and that the external air sucked from an air inlet/outlet 125 flows as shown by arrows 33*a*, 33*b*, 33*c* and 33*d*, and thereafter flows through a through-hole 126*a* to the vicinity of the back entrance of a fan 18 as shown by an arrow 33*e*. Under this constitution, since the air flow taken in from the air inlet/outlet 125 and warmed by a switching element 21 is not introduced to a motor 3, cooling of the motor 3 is not obstructed. Further, since the air taken in from the air inlet/outlet 125 directly blows also in the switching element 21, the effective cooling characteristic can be kept. Further, although a wind guide plate 122 is not provided in the fourth embodiment, it may be provided similarly. Further, as in the third embodiment, a heat insulating material 123 may be disposed on the inner periphery side of a grip portion 6*b*.

Figure 14:
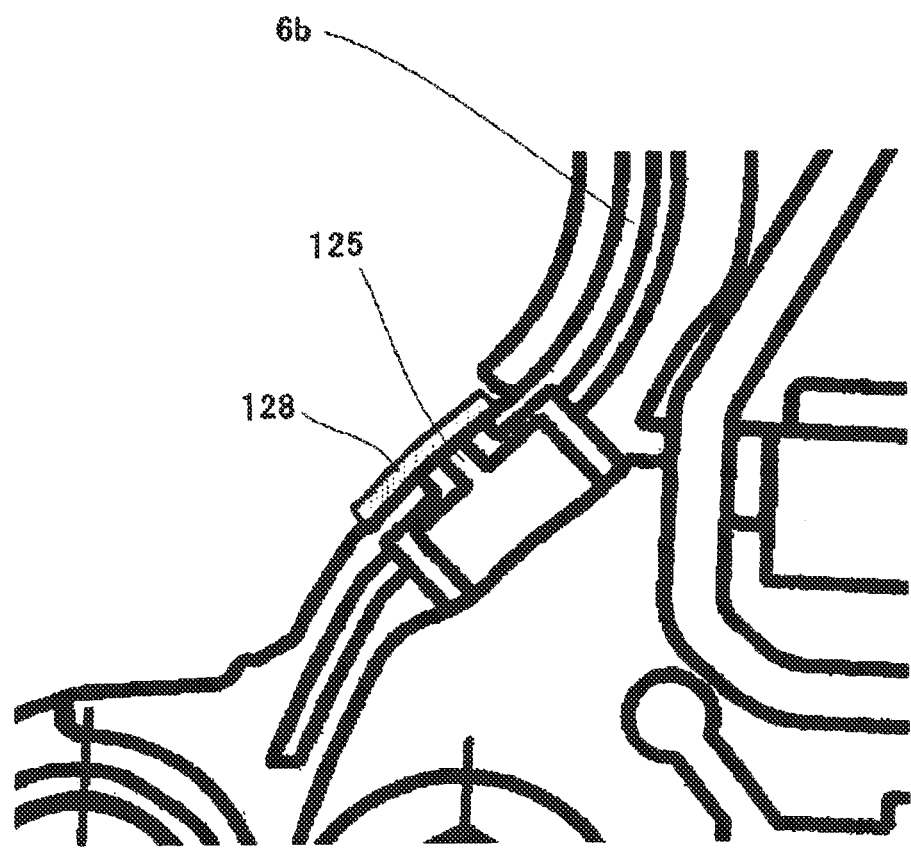
FIG. 14, relating to a modified example of the fourth embodiment of the invention, is a sectional view showing a state where a filter 128 is attached to an air inlet/outlet 125.

Further, as a modified example of the fourth embodiment, a filter 128 may be attached to the air inlet/outlet 125 as shown in FIG. 14. The filter 128 is, for example, an adhesive tape formed by a porous film, which is stuck from the outside of the housing 6. The porous film permits gas such as air or water vapor to pass, and repels liquid such as water and solid such as powder dust. Therefore, it is desirable that the porous film has pores having the size of about 0.1 to 10 µm. As the porous films, for example, a 4-fluorinated ethylene porous film or a film formed of polytetrafluoroethylene (ePTFE) can be used.

The size of the pore of the porous film may be 0.001 to 0.1 µm. By the pore having such the size, water-proof property is enhanced more, and it is possible to prevent intrusion of the water drop and powder dust more surely. Further, the size of the pore of the porous film may be 10 to 1000 µm. By the pore having such the size, air permeability is enhanced more. Therefore, inflow of the air to the inside of an outer frame is facilitated more. Accordingly, resistance when the air flows in the housing is reduced, and efficiency of the fan 18 can be enhanced.

As an example of attaching the filter 128, the modified example of the fourth embodiment has been described in this specification. However, the filter 128 can be combined with other all the embodiments. Further, in the example of FIG. 14, the filter 38 is the adhesive tape and is stuck to the outside of the housing 6, but may be stuck to the inside of the housing 6. Further, the filter 128 is not the adhesive tape but may be housed in a filter case attached to the housing 6 or may be housed in a portion formed by machining the housing 6.

Figure 15:
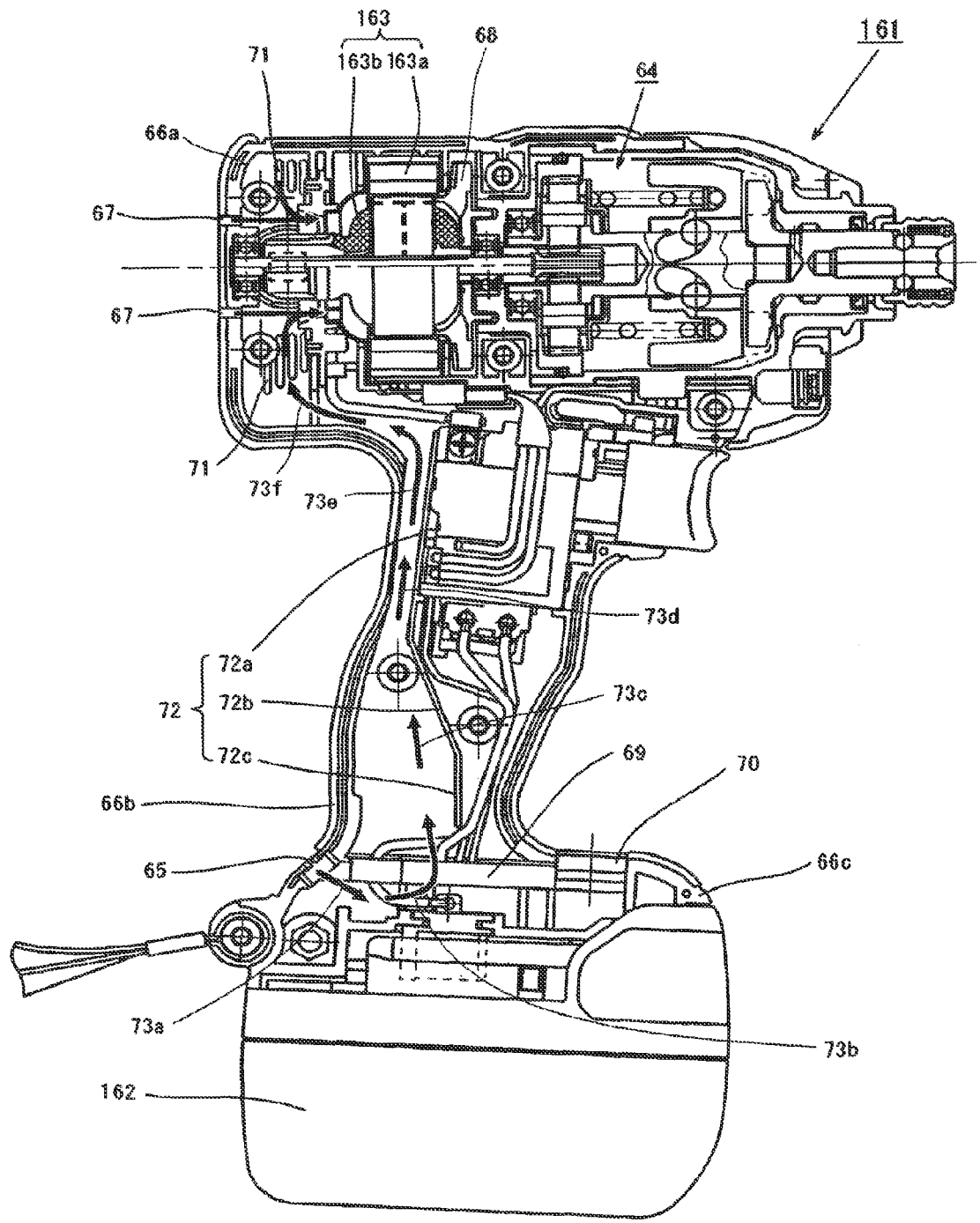
FIG. 15 is a diagram showing the internal structure of an impact driver according to a fifth embodiment of the invention.

Next, with reference to FIG. 15, a fifth embodiment of the invention will be described. The fifth embodiment is different from the first embodiment (FIG. 8) in that a motor for rotating an impact driver 161 is a brushed direct-current motor 163. However, the constitution of a rotary impact mechanism 64 is the same as the rotary impact mechanism 4 in the first embodiment. The direct-current motor 163 includes a stator 163*a* using permanent magnets, and a rotor 163*b* to which electric current is supplied through a brush. In front of the direct-current motor 163, a fan 68 for cooling the direct-current motor 163 is provided coaxially with a rotational shaft of the direct-current motor 163. By the air flow generated by the fan 68, the air is sucked from an air intake 67 and a slit 71 provided in a body portion 66*a* of a housing. Further, the air is sucked also from an air inlet/outlet 65 provided in a battery retaining portion 66*c* of the housing, and the sucked air flows as shown by arrows 73*a* and 73*b*, and cools an element mounted on a control board 69. Thereafter, the air flows to the inside of a handle portion 66*b* of the housing, and flows through passages shown by arrows 73*c*, 73*d*, 73*e* and 73*f* into the back portion of the direct-current motor 163.

Inside the handle portion 66*b*, a wind guide plate 72 is provided, which includes a lower guide wall 72*c* which widens a flowing passage downward and narrows the flowing passage upward a little, a central wall 72*b* which narrows the flowing passage greatly near the center, and a upper guide wall 72*a* which keeps the narrow flowing passage at the upper portion of the handle portion 66*b*. The front upper portion of a control circuit 69 is provided with a control panel 70.

As described above, according to the invention, by means of the fan attached to the rotational shaft of the motor, in the handle portion of the housing, the air flows from the body portion to the battery side (from the upside to the downside), or from the battery side to the body portion side (from the downside to the upside). Therefore, the handle portion, or the control circuit board and the electron element provided in the battery retaining portion can be effectively cooled.

Further, since the switching element 21 is arranged not on the rear end side of the motor but in the handle portion of the housing or in the battery retaining portion, the front-rear length of the body portion of the housing can be shortened, whereby a compact power tool can be realized. Further, since the electronic element which is large in heat generation can be mounted in the handle portion of the housing, size-reduction of the electric power tool and degree of freedom in design of the electric power tool can be enhanced.

Having described the invention with reference to the embodiments, the invention is not limited to the above-mentioned embodiments, but various changes can be made in the invention without departing from the spirit and scope thereof. For example, in the embodiments, though the example in which the electric power tool of the invention is applied to the impact driver has been described, the invention can be similarly applied also to an arbitrary power tool which uses an electric motor as a drive source.

The present application is based on Japanese Patent Application No. 2008-141409, filed on May 29, 2008, and Japanese Patent Application No. 2008-224176, filed on Sep. 1, 2008, the entire contents of which are incorporated herein by reference.

The invention claimed is:

1. A power tool comprising:
   a motor including a rotational shaft extending in a front-rear direction;
   a fan attached to the rotational shaft;
   a circuit board including a plurality of switching elements; and
   a housing including a body portion, a handle portion, and a battery retaining portion; the body portion accommodating the motor and the fan; the handle portion extending from the body portion and including an airflow passage in which the circuit board is arranged; the battery retaining portion including an air intake,
   wherein a wall portion is located between the fan and the circuit board in a radial direction of the fan, is configured to prevent air from flowing from the fan to the circuit board, and includes an opening for airflow from the handle portion into the body portion, and
   wherein rotation of the fan generates a flow of air that flows through the air intake to the airflow passage, through the airflow passage to the opening, through the opening to the body portion, and inside the body portion.

2. The power tool according to claim 1, wherein the circuit board is arranged in the airflow passage so that the flow of air flows along the circuit board.

3. The power tool according to claim 2, wherein the flow of air flows along the circuit board, flows inside the motor, and is exhausted to the outside of the housing.

4. The power tool according to claim 2, wherein the flow of air flows along the circuit board, flows to an input side of the fan, and is exhausted to the outside of the housing.

5. The power tool according to claim 1, wherein:
   the body portion includes a second air intake,
   the rotation of the fan draws a second flow of air into the body portion from the second air intake, and
   the second flow of air flows inside the motor and is then exhausted to the outside of the housing.

6. The power tool according to claim 5, wherein the flow of air from the air intake joins the second flow of air from the second air intake inside the body portion.

* * * * *